Aug. 25, 1970   T. G. EANNARINO   3,525,839
INDUCTION HEATING DEVICE

Filed Aug. 21, 1968   2 Sheets-Sheet 1

INVENTOR
THOMAS G. EANNARINO
BY Michael A. O'Neil
ATTORNEY

United States Patent Office 3,525,839
Patented Aug. 25, 1970

3,525,839
INDUCTION HEATING DEVICE
Thomas G. Eannarino, Park Ridge, Ill., assignor to Teletype Corporation, Skokie, Ill., a corporation of Delaware
Filed Aug. 21, 1968, Ser. No. 754,438
Int. Cl. H05b 5/00, 9/02
U.S. Cl. 219—10.49     14 Claims

ABSTRACT OF THE DISCLOSURE

An induction heating device has a pair of tubular heating coils which define first and second heating stations. The coils are electrically connected in series and have a common inlet and a common outlet for a coolant. A tube electrically connecting the downstream end of the first coil with the upstream end of the second coil is blocked for separating coolant flow through said coils. A first duct connects the downstream ends of both coils and another duct connects the upstream ends of both coils for providing parallel coolant flow paths through said coils.

BACKGROUND OF THE INVENTION

The manufacture of high quality piece parts frequently requires the heating of parts to a certain temperature without exceeding that temperature. Also, it is frequently neecssary to heat certain portions of parts to higher temperatures than other portions. To date it has been difficult to meet these requirements with induction heating devices because, by their very nature, induction heating devices tend to heat uniformly.

SUMMARY OF THE INVENTION

In the preferred embodiment an induction heating device has first and second electrically series connected tubular coils which define spaced apart heating stations and comprise heating means with a common fluid inlet and a common fluid outlet for circulating a coolant through the coils. Means are provided for fluidally isolating the first and second tubular coils, each from the other. In a more limited aspect of the invention the isolating means comprises first and second parallel fluid paths through the coils.

DESCRIPTION OF THE DRAWINGS

A more complete understanding of the invention may be had by referring to the following Detailed Description when taken in conjunction with the drawings wherein.

DETAILED DESCRIPTION

Figure 1:
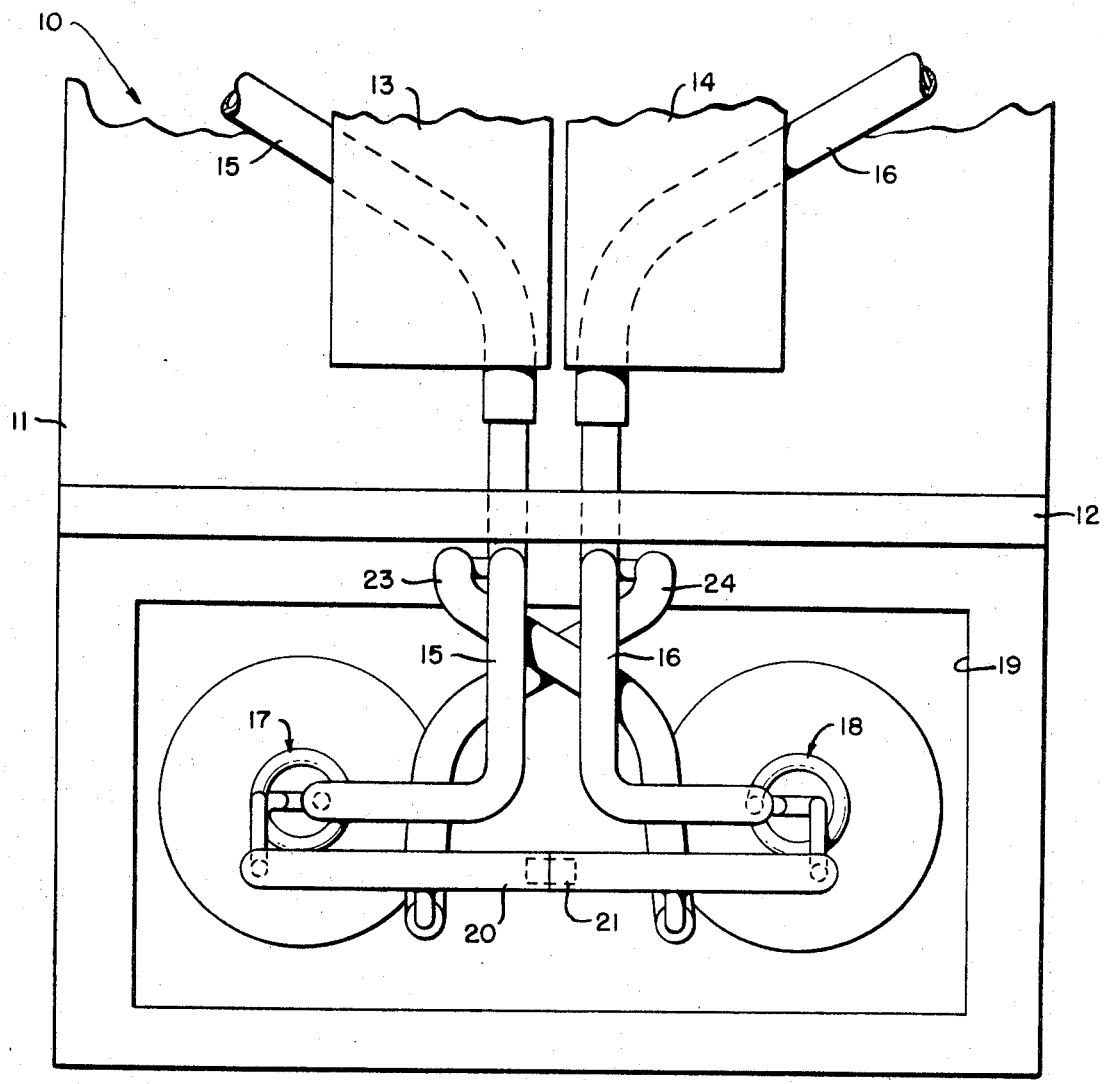
FIG. 1 is a top view of a heating device employing the present invention.
Figure 2:
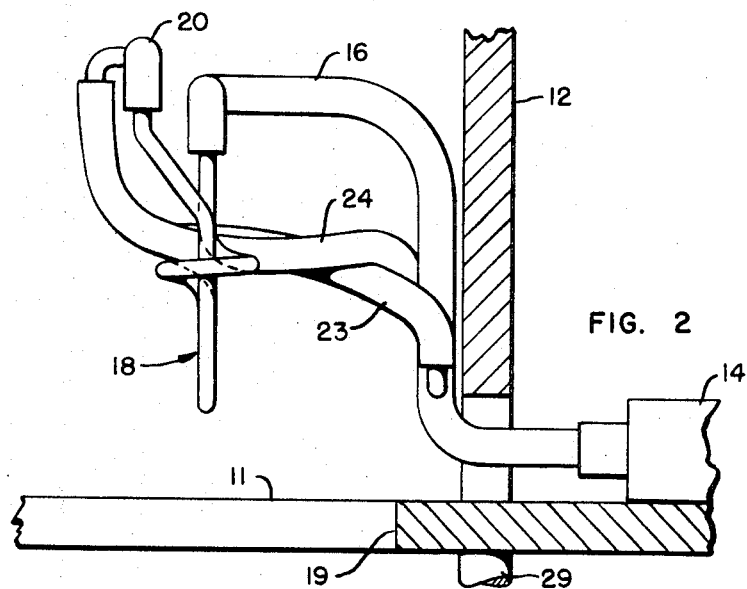
FIG. 2 is a right side view of the device shown in FIG. 1.

Referring to the drawings wherein like reference numerals designate like parts throughout the several views and referring particularly to FIG. 1 thereof, there is shown a heating device 10 including a supporting plate 11 and an upright plate 12 extending from the supporting plate 11. A pair of bus bars 13 and 14 are mounted on the supporting plate and serve to supply induction heating electric power to the heating device 10. A pair of tubes 15 and 16 formed from an electrically conductive material such as copper or the like extend through the bus bars 13 and 14 and serve to supply cooling fluid to and to remove cooling fluid from the heating device 10 and to convey induction heating current from the bus bars 13 and 14.

The tubes 15 and 16 extend from the bus bars 13 and 14 through the plate 12 to a pair of induction heating coils 17 and 18 which are formed from an electrically conductive material such as copper or the like. The coils 17 and 18 are positioned over a rectangular hole 19 formed in the supporting plate 11 and are interconnected by an electrically conductive crossover tube 20. Since the tubes 15 and 16, the tube 20 and the coils 17 and 18 are formed from interconnected lengths of electrically conductive tubing the heating device 10 may be thought of as including a single length of conductive tubing extending from the bus bar 13 through the coils 17 and 18 to the bus bar 14.

Ordinarily the crossover tube 20 would serve both to convey induction heating current between the coils 17 and 18 and to convey cooling fluid between the coils 17 and 18. In the heating device 10, however, a plug 21 is positioned in the center of the crossover tube 20 and serves to prevent cooling fluid from flowing through the crossover tube 20. Cooling fluid is supplied to the coil 18 by a tube 23 extending from the tube 15 to a point in the crossover tube 20 between the plug 21 and the coil 18. Likewise, cooling fluid is removed from the coil 17 by a tube 24 extending from a point in the crossover tube 20 between the coil 17 and the plug 21 to the tube 16. Unlike the remainder of the heating device 10, the tubes 23 and 24 are formed from an insulating material such as plastic.

Figure 3:
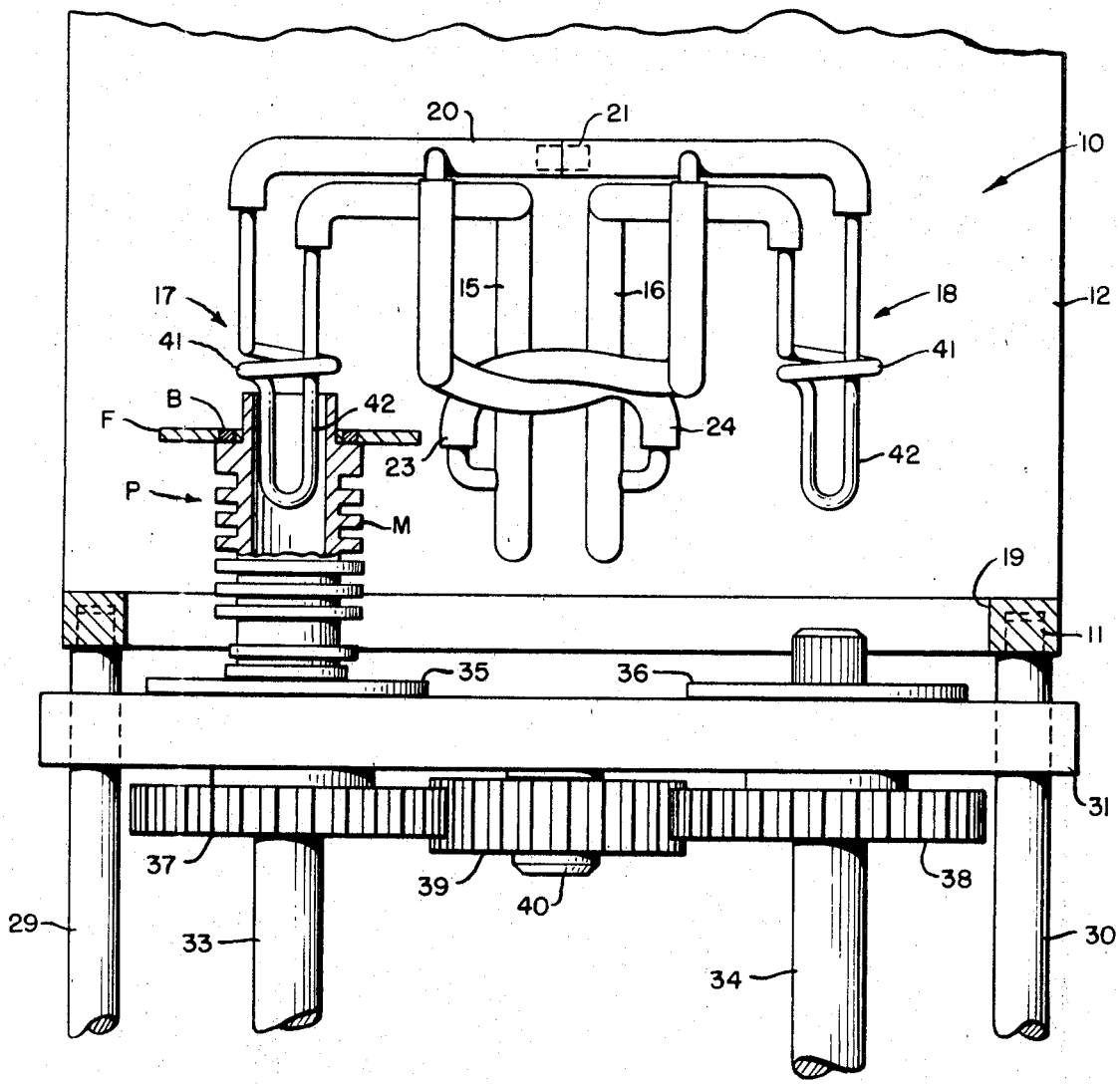
FIG. 3 is a front view of the device shown in FIG. 1.

Referring now to FIG. 3 it will be seen that the supporting plate 11 is supported on a pair of supports 29 and 30 which comprise two of a plurality of supporting members that serve to support the heating device 10. The supports 29 and 30 also slidably support a bearing plate 31 mounted below the hole 19 in the plate 11. The bearing plate 31 rotatably supports two shafts 33 and 34 which in turn support a pair of turntables 35 and 36. A pair of gears 37 and 38 are rigidly attached to the shafts 33 and 34, respectively, and are interconnected by an idler gear 39 that is rotatably supported on a stub shaft 40 extending downwardly from the bearing plate 31.

The turntables 35 and 36 are adapted to support and the heating device 10 is designed to heat piece parts P each comprised of a main body portion M and a flange F that is to be attached to the main body portion M by brazing. The brazing operation is carried out in the heating device 10 which serves to melt brazing plugs B positioned in holes in the flange F which upon melting braze the flange F to the main body portion M of the piece part P. The coils 17 and 18 are especially designed to melt the brazing plugs B in that they are each comprised of a ring section 41 which serves to heat the flange F of the piece parts P and a U-shaped section 42 which serves to heat the main body portion M thereof.

The heating device 10 differs from conventional heating devices of the induction type and is especially useful in heating operations wherein a certain temperature, such as the melting temperature of the brazing plugs B, must be reached but wherein intense heating can easily damage delicate piece parts, due to the use of the tubes 23 and 24 to convey cooling fluid to and from the coils 17 and 18.

Assume that at a given instant induction heating current is flowing from the bus bar 13 through the heating device 10 and out the bus bar 14. This means that current is flowing through the ring section 41 of the coil 18 in a counterclockwise direction about the axis of the ring section 41. The tube 23 extends from a point between the bus bar 13 and the coil 17 to a point between the coil 17 and the coil 18, that is, from a point of high electrical potential to a point of somewhat lower potential. Since the tube 23 is formed from an insulating material current cannot flow through it, however, the potential gradient across the coil 17 does cause a small amount of induction heating current to flow in the fluid carried by the tube 23. This current flows past the ring section 41 of the coil 18 in the same instantaneous direction as the flow of current through the ring section 41 and accordingly the flux generated by the current in the tube 23 tends to cancel the heating effect of the flux generated by the current flowing through a portion of the ring section 41. The tube 24 similarly extends from a point of relatively high electrical potential to a point of relatively low potential and accordingly the fluid in the tube 24 similarly carries a small amount of induction heating current past the ring section 41 of the coil 17 in a direction that tends to cancel the heating effect of a portion of the current in the ring section 41.

The canceling effects of the currents flowing in the tubes 23 and 24 form zones of lower temperature in the areas lying between the coils 17 and 18 and the tubes 24 and 23, respectively. This fact is employed in the operation of the heating device 10 wherein a pair of piece parts P each comprised of a main body portion M a flange F and a pair of unmelted brazing plugs B are positioned on the turntables 35 and 36 and the plate 31 is then raised so that the coils 17 and 18 extend into the piece parts P in the manner shown in FIG. 3. One of the shafts 33 and 34 is rotated either by a motor (not shown) or by hand to bring one of the brazing plugs B on each of the piece parts P into a low temperature zone between one of coils 17 or 18 and one of the tubes 24 or 23. The heating device is then actuated by directing induction heating power through the coils 17 and 18 from the bus bars 13 and 14. The brazing plugs B of the piece parts P that are not positioned in the low temperature zones are quickly melted by the action of the induction heating current. The brazing plugs B in the low temperature zone are not melted but are instead heated to a temperature below their melting points. One of the shafts 33 or 34 is then rotated to bring the previously melted brazing plugs B into the low temperature zones and to bring the unmelted plugs out of the low temperature zones. The unmelted plugs B are then quickly melted by the action of the induction heating power while the previously melted plugs start to cool in the low temperature zones. Thus, the use of the tubes 23 and 24 allows the movement of the previously melted plugs into a zone wherein they are not further heated thereby assuring that the piece parts P will not be damaged by excessive heating which might be caused if it were not possible to move melted brazing plugs into a low temperature zone while the melting of other plugs takes place.

By way of example, if the tubes 15 and 16 of a heating device similar to that shown in drawings are formed from ⅜" copper tubing, the tube 20 from ¼" copper tubing, the coils 17 and 18 from ⅛" copper tubing and the tubes 23 and 24 from ¼" plastic tubing, if the tube 15 is connected to a source of ordinary tap water and if the bus bars 13 and 14 are connected to a source of induction heating power regulated to maintain the input to the heating device 10 at 15 kilowatts and the output at 12 kilowatts the coils 17 and 18 will heat portions of parts P positioned between the coils 17 and 18 and the tubes 24 and 23 to about 1200° F. and will heat portions positioned radially oppositely from the tubes 24 and 23 to about 2000° F.

The parallel flow paths provided by the foregoing construction are discrete and preclude mixing of liquid passed through any of the coils with liquid to be passed through the other coil. Thereby maximum cooling of the coils can be effected, notwithstanding their series electrical connection.

Although only one embodiment of the invention is shown in the drawing and described in the foregoing specification, it will be understood that the invention is not limited to the specific embodiment described but is capable of modification, rearrangement and substitution of parts and elements without departing from the spirit of the invention. Specifically, it will be understood that the heating coils of the device need not be of the shape shown and described but may be of any desired shape and that cooling fluid need not be directed through the device in any specific direction, but may be directed through the device in either direction as desired.

I claim:
1. A heating device of the type including a pair of hollow induction heating coils, a first length of hollow tubing fluidally connected to a first of the coils for conveying cooling fluid thereto, a second length of hollow tubing fluidally connected to a second of the coils for conveying cooling fluid therefrom and a third length of hollow tubing fluidally connected to the coils, wherein the improvement comprises:
   means for preventing cooling fluid from flowing through the third length of hollow tubing, and
   means fluidally connected to the first length of hollow tubing for conveying fluid to the second length of tubing and bypassing the second of the coils.

2. The device according to claim 1 further characterized by means fluidally connected to the first of the coils and the second length of hollow tubing for conveying cooling fluid from and bypassing the first of the coils.

3. The device according to claim 2 wherein the first length of hollow tubing, the second length of hollow tubing and the third length of hollow tubing are all formed from a conductive metal and serve to direct heating current through the heating coils.

4. The device according to claim 3 wherein the means connected to the first length of tubing and the means connected to the first of the coils are hollow tubes formed from an insulating material.

5. A heating device comprising:
   a length of hollow, electrically conductive tubing having a delivery section, a first coil section, a crossover section, a second coil section and a discharge section physically connected in series;
   means for causing electrical energy to flow through the tubing;
   means for delivering cooling fluid into the delivery section of the tubing and for removing cooling fluid from the discharge section of the tubing;
   means for preventing cooling fluid from flowing through the crossover section of the tubing;
   means for directing cooling fluid from the delivery section past the second coil section of the second coil section, and
   means for directing fluid from the first coil section past the first coil section to the discharge section of the tubing.

6. The heating device according to claim 5 wherein the means for preventing cooling fluid from flowing through the crossover section is a plug positioned in the crossover section, wherein the means for directing cooling fluid from the delivery section to the second coil section is a length of tubing which bypasses the second coil section and is fluidally connected to the delivery section and a point in the crossover section between the plug and the second coil section and wherein the means for directing fluid from the first coil section to the discharge section is a length of tubing fluidally connected to a point in the crossover section between the first coil section and the plug past the first coil section and a point in the discharge section.

7. The heating device according to claim 6 wherein the lengths of tubing which comprise the two directing means are comprised of lengths of hollow tubing formed from an electrical insulating material.

8. In an induction heating device wherein the heating means comprises first and second electrically series connected tubular coils defining spaced apart induction heating stations with a common fluid inlet and a common fluid outlet for circulating a coolant through said coils and an electrically conductive tubular section having opposed portions fluidally connected to said first and second coils, the improvement comprising means for fluidally isolating said first and second coils each from the other.

9. A combination according to claim 8 characterized in that said isolating means comprises first and second discrete fluid paths for the coolant and through said coils, respectively.

10. A combination according to claim 9 wherein said paths are connected for parallel flow.

11. A combination according to claim 10 characterized by:
- a conductive tube connecting said first and second coils;
- a plug comprising said isolating means arranged in said tube for blocking flow between said coils and separating the opening through said tube into a first and a second parts, said first part extending from and in fluid communication with said first coil, said second part extending from and in fluid communication with said second coil;
- a first conduit connected to said first part for fluid communication with said second coil; and
- a second conduit connected to said second part for fluid communication with said first coil.

12. A combination according to claim 11 wherein said first conduit is arranged for delivering fluid from said first part to said outlet and said second conduit is arranged for transporting fluid from said inlet to said second part.

13. A combination according to claim 11 wherein said conduits are formed from insulating material.

14. A combination according to claim 12 wherein the first part is disposed downstream of the first coil and the second part is disposed upstream of the second coil.

References Cited

UNITED STATES PATENTS

| 2,479,341 | 8/1949 | Gehr et al. | 219—10.79 |
| 2,678,371 | 5/1954 | Andrew | 219—10.79 |
| 3,108,169 | 10/1963 | Keller | 219—10.79 X |
| 3,081,391 | 3/1963 | Segsworth | 219—10.49 |

JOSEPH V. TRUHE, Primary Examiner

L. H. BENDER, Assistant Examiner

U.S. Cl. X.R.

219—10.79